United States Patent [19]

Richey et al.

[11] 4,151,416

[45] Apr. 24, 1979

[54] DYNAMIC UNIFORM FLOOD CORRECTION FOR RADIOISOTOPE CAMERAS

[75] Inventors: Joseph B. Richey, Shaker Heights; Robert H. Wake, Warrensville Heights; Henry H. Wilson, Solon; Michael C. Cheiky, Hiram, all of Ohio

[73] Assignee: Ohio-Nuclear, Inc., Solon, Ohio

[21] Appl. No.: 822,351

[22] Filed: Aug. 5, 1977

Related U.S. Application Data

[63] Continuation of Ser. No. 684,241, May 7, 1976, abandoned.

[51] Int. Cl.$^2$ .............................................. G01T 1/20
[52] U.S. Cl. .............................................. 250/363 S
[58] Field of Search ................ 250/363 S, 369, 366

[56] References Cited

U.S. PATENT DOCUMENTS

| | | |
|---|---|---|
| 3,745,345 | 7/1973 | Muehllenhiner ............... 250/363 |
| 3,752,981 | 8/1973 | Jaszczak ........................ 250/368 |
| 3,752,988 | 8/1973 | Culver .......................... 250/270 |
| 3,774,032 | 11/1973 | Lange ........................... 250/368 |
| 3,904,530 | 9/1975 | Martone et al. .............. 250/369 |

Primary Examiner—Alfred E. Smith
Attorney, Agent, or Firm—Fay & Sharpe

[57] ABSTRACT

The intrinsic nonuniformity of a radioisotope camera having an array of photomultiplier tubes viewing a scintillator crystal assembly is improved by comparing an internally generated correction factor from 1 to n, assigned to a location where a radiation event has been detected, to a random number between 1 and n and then discarding the radiation event datum if the correction factor is less than the random number. Correction factors are first generated by comparing the count at each location with an average minimum count in the presence of a uniform flood source.

18 Claims, 1 Drawing Figure

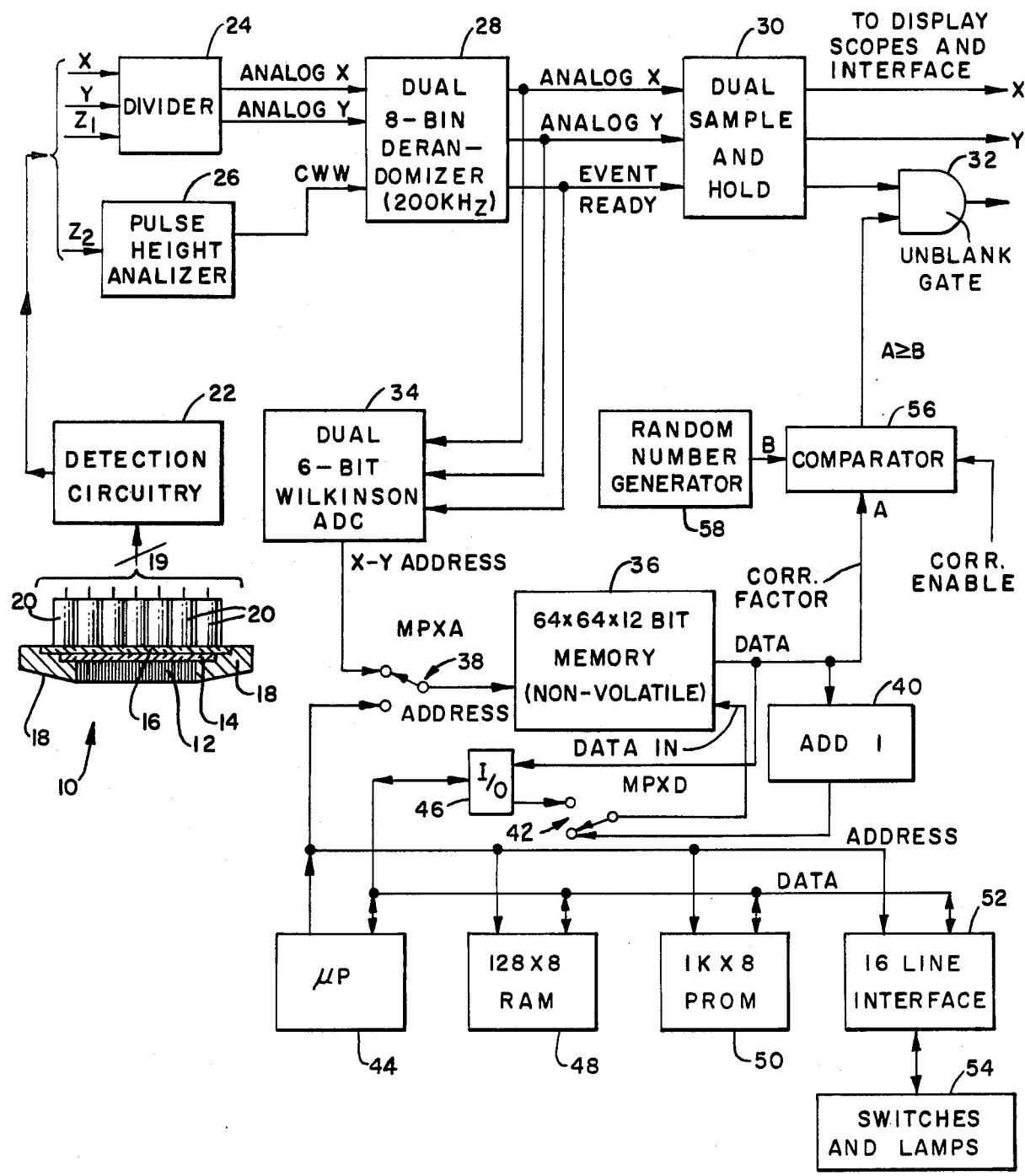

DYNAMIC UNIFORM FLOOD CORRECTION FOR RADIOISOTOPE CAMERAS

This is a continuation, of application Ser. No. 684,241, filed May 7, 1976, now abandoned.

BACKGROUND OF THE INVENTION

The invention relates generally to the field of radioisotope cameras and, more particularly, to circuitry for automatically correcting intrinsic nonuniformities in the displayed image.

Diagnosis of tumors and other diseased tissue has been greatly facilitated by the advent of nuclear medicine. For example, small amounts of radioisotopes, after being administered to a patient, concentrate differently in diseased and healthy tissues. The different concentration of radiation, usually gamma rays, emitted by the healthy and diseased tissues are thus distinct and can be detected. The machines used to detect the radiation usually utilize a collimator to direct or transmit radiation to a scintillation system which changes the radiation to visible light during a scintillation. Photomultiplier tubes detect the light and various means are used to locate the scintillations in the scintillator and, thus, indirectly to find the tumor or other irregularity in the patient.

Radiation imaging devices include dynamic scanning machines and static radiation cameras. Both devices have inherent limitations. The scanners move slowly over the patient and are therefore considered to have better resolution and field uniformity. However, because scanners take a relatively long time to detect the radiation, they create some patient discomfort. A static imaging device, on the other hand, is relatively fast because it takes a single stationary picture. While faster than the scanner, the radiation camera does not yield as good resolution and field uniformity as the scanner. Resolution is used herein to mean the ability of the machine to distinguish two spaced points or line sources of radiation.

An example of an early radiation camera is shown in U.S. Pat. No. 3,011,057 to Anger and U.S. Pat. No. 3,911,278 to Stout, the disclosures of which are incorporated by reference. The scintillation camera uses an array of parallel photomultiplier tubes spaced away from the scintillation crystal assembly so that the tubes view overlapping areas of the crystal. Thus, a scintillation in the crystal is detected and converted to an electrical pulse by several of the tubes at once. The electrical output of the photomultiplier tubes is amplified and algebraically manipulated by suitable circuitry and discriminated for proper pulse height for gamma radiation to produce an analog intensity signal (z axis) and a pair of x,y deflection voltages which are applied to a storage oscilloscope or nonstorage oscilloscope used in conjunction with photographic film. The oscilloscope reproduces each scintillation as a bright spot on the cathode ray tube screen located in accordance with the x,y voltages. Each scintillation event is separately displayed so that over a period of time, an image of all of the scintillations which have occurred in the scintillation crystal over that period of time is obtained. Using conventional collimator techniques involving apertured lead shields, the image on the screen will show an image of the actual distribution of the radiation in the organ being viewed by the camera.

In the 3,011,057 patent, the spacing of the tubes from the scintillators causes the failure of some photons to be detected by the photomultiplier tubes and a loss in resolution results. If this loss in resolution caused by spacing the tubes away from the crystal can be avoided, static radiation cameras can yield results which are more comparable to those of the scanning devices.

The present invention seeks to overcome the disadvantage of the prior art static camera devices. In particular, this invention relates to improving the uniformity of scintillation cameras. Prior scintillation cameras use a hexagonal array of parallel photomultiplier tubes placed directly against or spaced from the scintillation crystal assembly so that there is overlapping in the field of view of the crystal. In this position, the tubes receive photons; however, nonuniformity of the image may result.

Attempts have been made with various degrees of success to electronically correct the nonuniformity which is created when the photomultiplier tubes receive radiation from the crystal assembly. The correction of field uniformity is important to the correct reading of results. That is, if nonuniformity is present, a misinterpretation of clinical test could occur.

An electronic uniformity correction scheme is shown in U.S. Pat. No. 3,745,345 Muehllenhner. In the Muehllenhner patent, correction factors are determined, stored and employed to correct output signals from the camera by changing the x,y coordinates. A wired program data system receives digitized coordinate signals and corrects the digitized signals in accordance with stored coordinate correction factors. The corrected digitized signals are then reconverted to analog form and used to operate a conventional CRT display. The disadvantage of this system is that it does not use the original analog coordinate signals for display purposes and does not operate in real time. By the time the deflection voltages are generated, the positional information has been converted, altered and reconverted, thus, introducing error as well as delay with each operation.

SUMMARY OF THE INVENTION

The intrinsic nonuniformity of a radioisotope camera having photomultiplier tubes substantially adjacent to the scintillation crystal assembly is improved by storing a plurality of integer correction factors from 1 to n for a matrix of locations. With a uniform flood source, the count at each location is compared with an average minimum count to generate the correction factors. In operation, the correction factor for a location where a radiation event has been detected is compared to a random number between 0 and n. If the correction factor is less than the random number, the radiation event is ignored.

BRIEF DESCRIPTION OF THE DRAWING

The single FIGURE is a block and schematic diagram illustrating a preferred embodiment of the correction circuitry for performing dynamic uniform flood correction according to the invention.

DESCRIPTION OF THE PREFERRED EMBODIMENT

A conventional radioisotope camera is shown in the drawing at 10. Its function is to detect gamma radiation emitted by a body, for example, a thyroid gland, which has absorbed a radioisotope injected into the blood stream. The camer's field of view is defined by a straight hole collimator 12. Radiation passing freely through the holes of the collimator 12 strikes the surface of a disc-shaped scintillation crystal 14 of about ½ inch thickness which is adhered by means of an epoxy to a thin glass plate 16, $\frac{1}{4}$ inch to $\frac{3}{4}$ inch in thickness. The scintillation crystal, 14 interacts with impinging radiation from the collimator 12 by producing visible scintillations or light flashes. Thus, the scintillation crystal converts gamma radiation to visible radiation. The light flash in the scintillation crystal will occur at precisely the point of the impinging radiation. Gamma rays from outside the field of view are eliminated by lead shielding 18.

A plurality of upright, parallel photomultiplier tubes 20 are arranged in a hexagonal configuration with their faces substantially adjacent to the surfaces of the glass plate 16. The number of tubes depends on the diameter of the tubes and the size of the scintillation crystal. Typically, either 19 or 37 adjacent tubes are employed depending on whether 3 or 4 tubes are used per side of the hexagon. In some cases, this invention is used where the distance between the face of the tubes 20 and the scintillation crystal 14 is so small that spatial distortion becomes a non-negligible problem which must be solved by correction circuitry. However, this invention is also applicable to cameras which have the crystal spaced from the photomultiplier tubes.

Each photomultiplier tube 20 responds to a flash of light in the crystal 14 within the tube's field of view and converts the light flash to a current pulse forming an electrical output. The electrical output of each tube 20 of the camera 10 is passed separately to detection circuitry 22 which performs the functions shown in the Stout Pat. No. (3,911,278), with the exception of the distortion correction circuit, of producing four analog output voltages, x and y representing the raw analog position coordinates of the light flash in the crystal 14 and intensity voltage $z_1$ and $z_2$ indicative of the raw analog, undiscriminated amplitude or intensity of the light flash. The intensity outputs, $z_1$ and $z_2$, relate to the total energy of the detected radiation event rather than its position. A total energy reading is necessary for two functions: normalizing the x,y values and screening to detect gamma radiation. The total energy values may have to be tailored for the two functions: thus, the two values $z_1$ and $z_2$, as in the Stout patent. Otherwise, a single total energy value z could be employed.

The x,y and z outputs of the detection circuitry 22 are passed to a dual divider circuit 24 substantially as shown in the Stout patent. The divider 24 is a linear (analog) circuit which normalizes the position information (x,y) for variations in intensity of the light flash, i.e., total energy of the radiation by dividing each coordinate by $z_1$. A pulse height analyzer circuit 26 receives intensity output $z_2$ from the detection circuitry 22 and using two analog comparators determines whether a valid gamma radiation event has occurred. The digital output CWW (count within window) signifies that a valid event has happened.

The analog x,y coordinate voltages from the divider 24 are applied to a dual 8 bit analog derandomizer 28 which is a dual analog first-in-first-out elastic buffer, enabled or triggered by the CWW signal. Light flashes (radiation events) occur at various positions on the crystal 14 at random times. The purpose of the derandomizer or buffer 28 is to temporarily store up and pay out the pulses at an orderly rate. The buffer 28 accepts x,y position information at random times and stores the information in a capacitive memory. The buffer can store up to eight x,y pairs for eight consecutive events. The output is exactly the same analog x,y voltages, but the spacing of the voltages in time is no longer at random but is synchronized to a 200 kilohertz clock. Thus, each event at the output of the buffer 28 appears to last for exactly 5 microseconds. The "event ready" signal of the buffer 28 corresponds to the CWW input signal.

The position information and event trigger are passed from the derandomizer to a dual analog sample and hold circuit 30. This circuit contains two capacitve memories and serves to delay the analog data by about 5 microseconds to provide just enough time for the correction circuitry to determine whether or not a specific event should be ignored, based on stored correction factors. After the delay, the analog x,y coordinates representing the location of the event are passed directly to the oscilloscope through an appropriate interface circuit (not shown) to provide deflection voltage, unless the oscilloscope video is blanked by AND gate 32. If the video is blanked, the x,y position voltages for the corresponding event will not produce a corresponding dot on the oscilloscope screen since there will be no video signal. The video will be unblanked however, if the count or event is one which should not be ignored, for example, any single count which is located toward the center of the screen in general.

The coordinates and event ready signal from the derandomizer 28 are also passed to a dual 6-bit Wilkinson analog-to-digital converter 34 which digitizes each pair of analog x,y coordinates in approximately four microseconds. The analog voltage level for the x,y coordinate is converted to a 6-bit binary number as is the y coordinate, resulting in a 12-bit "address", which is used to access a nonvolatile memory matrix 36 having $64 \times 64$ locations each 12-bits deep. The memory 36 may be visualized best as a matrix of 4,096 locations in a square configuration. In addition to an address input, the memory 36 also has a data output and a data input. While the memory 36 is being addressed by the converter 34 via the multiplex address switch 38, the data output and data input lines are coupled together in an "accumulator" mode via an add 1 circuit 40 and multiplex data switch 42. Thus, the contents of a given memory location addressed by the converter 34 will be read out and incremented by one and then read back into the same matrix location. The reason why this is an accurate way to store count information is that each appearance of a particular address signifies the occurrence of a nuitary radiation event.

The function of the memory 36 described thus far is referred to as the STORE flood function. With a flood source in view, the memory 36 continues to accumulate counts in all of the positions of the matrix until the count for the position at the center of the matrix reaches 1,024. To monitor the progress of the center count, every $\frac{1}{8}$ of a second during the STORE function the microprocessor 44 switches the multiplex address and data switches 38 and 42 to read the data for the center matrix location via a digital input/output transceiver 46. If the center count is less than 1,024, the microprocessor 44 returns the system to the STORE mode and continues to increment the counts at all of the matrix locations via the converter 34 as more radiation events are produced by the flood source.

The microprocessor 44 acts as a controller for three modes of operation, namely STORE, CALCULATE and CORRECT, as described in more detail below. Peripheral to the microprocessor are a random access memory 48 having 1,024 bits of alterable storage which the microprocessor uses as a scratch pad for temporary storage and a programmable read only memory 50 having 8,192 bits of read only memory, in which the STORE, CALCULATE, and CORRECT instructions are stored. In addition, several diagnostic instructions can also be stored in the programmable read only memory 50. A 16 line interface circuit 52 provides the mircoprocessor 44 with access to the outside world; that is, the front panel switches and indicator lamps 54 for the operator's use for control of the multiplex address and data switches 38 and 42 and a CORRECTION ENABLE signal described below which can disable the CORRECTION function so that an event which would otherwise be ignored is displayed.

The data input to the memory 36 during the CALCULATE and CORRECTION modes of operation is disabled by the multiplex data switch 42 controlled by the microprocessor 44. The manner in which the CALCULATE mode is carried out to store correction factors at the matrix positions where counts were originally stored is described in detail below. Suffice it to say in relation to the block diagram that corresponding 8-bit correction factors are stored for every memory location at the end of the CALCULATE mode. During the CORRECTION mode, the camera 10 is being used in its normal manner to produce an image of an object for diagnosis rather than a flood source. Radiation events occur and are spaced by the derandomizer 28 and passed to the sample and hold circuit 30 as analog x,y coordinates. While these coordinates are being held in the circuit 30, the analog-to-digital converter 34 is digitizing the same coordinates and addressing the memory 36 with them. The addressed matrix location in the memory 36 now contains an 8-bit correction factor which is read out to the comparator 56.

The comparator 56 receives the correction factor (A) and compares it with a number (B) produced by a random number generator 58. As discussed below, the correction factors can assume any value between 0 and 255. Similarly, the random number generator generates a synchronized random number selected from all of the numbers from 0 through 255. If the correction factor (A) is greater than or equal to random number (B) which happens to be presented by the generator 58 at that particular moment, then the output of the comparator coincides with the logic level of the event ready signal coming out of the sample and hold circuit 30 to unblank the video signal for the oscilloscope. On the other hand, if the correction factor is less than the random number, the video signal will remain blanked because of the lack of coincidence at the gate 32. The correction enable signal to the comparator 56 overrides the correction function and provides a coincident logic level to the gate 32 to keep the video unblanked.

Theory

The camera shown at 10 along with the detection circuitry 22 is commercially available from Ohio-Nuclear, Inc., the assignee of the present application and the Stout patent. A uniformly distributed radiation source, commonly referred to as a flood (or disc) source, should produce a uniform image on the oscilloscope which is controlled in accordance with the positional outputs of the detection circuitry 22. However, the camera 10 itself has an inherent nonuniformity problem: it does not give out an equal number of counts (radiation events) for every given area on the surface when a flood source is applied. If the number of counts at each point were equal as it should be, the imate on the oscilloscope would appear to be perfectly "flat". However, the nonuniformity is such that generally there is less activity in the center of the field than at the periphery. The high peripheral or rim count tends to produce a distorted image of a uniform flood which generally has a smooth bowl shape. In addition, nonuniformity in an electronic component or the photomultipliers or the holes of the collimator produce objectionable wrinkles in the bowl where there should be a perfectly flat image. These wrinkles are an artifact which can begin to look like a portion of an organ under observation.

The general approach of the present invention is to store a typical flood source count for a matrix positions covering the entire image field and then to manipulate real time data to try to flatten out the bowl based on an analysis of the stored flood. More precisely, the specific approach is to determine the low point (minimum count) in the bowl and to pull the counts at every other location down to the low point by rejecting counts. For example, if in relation to the low count of the bowl, a particular position has a 50 percent higher count, then in normal operation, every third count (on the average) which is received for that precise location is simply ignored. Likewise, if a neighboring location, hypothetically, had twice as many counts over a sampling interval at the low point of the bowl then in normal operation, every other count corresponding to the neighboring location is ignored or rejected. In practice because of the predictable shape of nonuniformity, generally speaking, counts that come at the very center of the field will never be rejected while some fraction of the counts that are out on the edges of the bowl will be rejected to pull the edges back down toward the level of the minimum value or low point in order to try to flatten the bowl.

One advantage of this system of simply rejecting events rather than performing correction on the analog voltage, is that it yields as high uniformity as desired without affecting resolution in the absolute sense. However, the more one corrects for the bowl shape, that is, the flatter the flood image, the more counts are thrown away. In practice, however, only 10 of 15 percent of the total count over a given sample interval is rejected. This simply means that the clinical image will take 5 to 15 percent longer to accumulate. In practice, the process will take a minimun amount of time and the operator will not even realize that the correction circuitry is discarding 10 15 percent of the counts before they get to the oscilloscope.

OPERATION

In operation, the STORAGE function with the flood source in position is continued until 1,024 counts are stored in the center location of the memory 36. When the center count is 1,024, as sensed by the microprocessor 44, the store function is terminated. At this point, the microprocessor 44 takes over and begins the CALCULATE function. In the CALCULATE mode, the microprocessor first searches through every location in memory 36 which coincides with the usable field of view (an inscribed hexagon effectively laid over the square memory matrix) in order to locate the location within the inscribed hexagon containing the minimum nuber of counts. Also, at the end of the STORE mode, both multiplex address and multiplex data switches are switched to the up position. After the minimum value in the inscribed hexagonal area of the memory matrix is found by the microprocessor, the eight immediate surrounding or neighboring locations of the minimum count location are examined. The eight immediate neighbors can be visualized as a square formed by eight dots with the ninth dot in the middle representing the minimum count location. The microprocessor 44 next determines the average of the counts at the eight immediate neighbors, without the minimum count itself and labels the average value "MIN".

Continuing with the CALCULATE mode, for every memory location in the memory 36, the microprocessor 44 replaces the count value obtained during the STORE mode with an individualized correction factor determined from the following formula:

$$X'_{ab}=((K+1)MIN/K\cdot X_{ab}+MIN)\cdot 255,$$

where $X'_{ab}$ represents the correction factor for location a,b of the memory matrix corresponding to x,y coordinates, K represents an integer weighting factor from 0 to 15 selected by program switches, MIN represents the average of the eight locations surrounding the minimum location and $X_{ab}$ represents the actual count value obtained during the store mode at location a,b.

There is one correction $X'_{ab}$ for each memory location. Of course, in many cases, adjacent locations will have exactly the same correction factor. A high correction factor will correspond to a low incidence of event rejection. The correction factors can vary from 1 to 255. The CALCULATE mode is completed when a correction factor has been stored in every memory location where a count value was previously stored during STORE mode.

The microprocessor 44 can be utilized to perform a special subroutine to indicate to the operator just how serious the nonuniformity is. Thus, subroutine is referred to as a RETUNE test, and is a direct analog of the first two operations of the calculate mode with correction factors in place instead of count values. The microprocessor locates the minimum correction factor within the inscribed hexagonal area of the memory matrix. Next, it determines the average of the eight immediate surrounding neighbors of this minimum and labels the average value MIN. If MIN (now representative of the minimum correction factor rather than the minimum count value) is less than 50 percent, a RETUNE indicator light is activated on the front panel of the instrument advising the operator that the instrument has so much nonuniformity that there may be a defective component in the instrument.

The CORRECTION mode of the operation has already been specified, but it bears elaboration to emphasize its simplicity. Each pair of analog x,y coordinate values is digitized by the converter 34 to access the corresponding stored correction factor (an integer from 1 to 255) from the memory 36. If the correction factor obtained from the memory 36 is greater than or equal to a random number selected from between 0 and 255, the video unblank gate 32 enables the oscilloscope to display the event; otherwise, the event is blanked or discarded. For example, if the correction factor is 128 for a given memory location, on the average every other time that an event occurs with that memory address, it will be discarded. If the correction factor for a given location is 64, on the average, every fourth event which occurs with that address will be ignored.

By using a random number generator, count correction is accomplished by randomly discarding the percentage of the count at a particular location. The object, however, is to reject a percentage of the total count over a given interval of time. It is inadvisable to reject a number of consecutive counts at a particular location. That is, if half of the total count over a given period of time should be rejected at one location, from a statistical sampling standpoint, it is more advisable to discard every other count than to discard either the first or the last 128 counts out of 256.

One of the advantages of the above-described system is the extreme simplicity of the correction operation itself. The analog x,y voltages themselves are not displaced or altered in any way. They are simply ignored for certain events so that a prearranged percentage of events which occur at a particular location are discarded on a random basis. The important point is that the analog signal which is passed to the oscilloscope is not really altered in any way through digitizing. The digitizing of the analog signal is performed in parallel with the analog sample and hold circuit 30 and serves only to access the memory to acquire a correction factor which, in cooperation with the random number generator, determines whether or not the event is recorded. The only effect on the analog voltages is that they are delayed a sufficient time, 5 microseconds, for example, to allow the correction factor to be retrieved and compared with a random number.

It is important to note that the memory 36, having only 4,096 memory locations, has inadequate capacity to store an actual image. The memory 36 simply does not have enough resolution for image storage. In comparison, however, the Muehllenhner patent (3,745,345) discusses the use of a 256×256 matrix array having 65,536 memory locations 10-bits deep. This matrix is actually used to store an image. Correction factors in the Muehllenhner patent are added directly to the digitized coordinates to provide a corrected digitized signal which is read out to the CRT after conversion back to analog form. In contrast, the analog signals which finally reach the deflection circuits for the oscilloscope in the present invention have never been digitized thus, providing a much faster, more accurate display. A further point of departure from the prior art, is that the system described herein can be viewed as real time processing, although it is recognized that the sample and hold circuit does add a five microsecond delay. It is true to say, however, that live processing is carried out without intermediate digital storage or computation, and this results in the system operation much closer to an idealized real time mode.

While the described invention corrects to a planar function with the degree of correction being given by K, the correction may also be made to any smoothly fitted function, such as a paraboloid of revolution.

Also included in this invention is the alternate possibility of correcting field uniformity by adding events, both adding and discarding events, by altering the energy window or by altering the intensity of signal dots flashed on an output oscilloscope. The above-described event rejection is the preferred embodiment, but the primary advantage is the correction of data in real time by any of these methods or appurtenant apparatus.

The invention may be embodied in other specific forms without departing from its basic principles. The present embodiment as shown and described in connection with the single figure is, therefore, to be considered in all respects as illustrative rather than restrictive. The scope of the invention is indicated by the appended claims, and all changes which come within the meaning and range of equivalents of the claims are, therefore, intended to be embraced therein.

The invention claimed is:

1. A radiation sensing device comprising:
   a radiation camera including scintillator means for converting radiation to light flashes and an array of photosensitive means viewing said scintillator means for converting said light flashes to a plurality of electrical signals indicative of the energy and location of the radiation;
   detection circuit means responsive to said plurality of electrical signals from said camera for producing a pair of analog x,y coordinate values indicative of the location of a valid radiation event;
   memory means for storing a plurality of correction factors between 0 and n corresponding to a predetermined plurality of locations;
   means for using the x,y coordinate values from said detection circuit means to retrieve the corresponding correction factor from said memory means;
   means for generating random numbers selected from between 0 and n;
   comparator means for comparing the corresponding correction factor retrieved from said memory means with the number generated by said random number generating means to produce an output indicative of whether said correction factor has a predetermined relationship with said random number;
   display means responsive to said analog x,y coordiante values for displaying a valid event at a location corresponding to said analog x,y coordinate values; and
   gate means for controlling said display means in accordance with the output of said comparator means.

2. The radiation sensing device in claim 1, wherein said gate means produces a blanking signal to said display means when said predetermined relationship between said correction factor and said random number exists in order to reject a particular event.

3. The radiation sensing device of claim 1, wherein said memory means is a digital memory providing a matrix of predetermined memory locations evenly distributed over the effective field of view of said photosensitive means, and said means of using analog x,y corrdinate values includes means for converting each pair of x,y coordinate values to a digital address for a corresponding location of said memory matrix.

4. The radiation sensing device of claim 3, further comprising digital controller means for operating said memory means in a STORE mode such that counts corresponding to successive events at a location corresponding to a matrix location are accumulated in the matrix location over a sampling period, said controller means also including means for determining an average minimum count value over a plurality of neighboring matrix locations and comparing the minimum count thus derived to the count values at all other locations to generate said correction factors.

5. The radiation sensing device of claim 4, wherein said controller means includes means for deriving said correction factors in accordance with the following formula:

$$X'_{ab} = (K+1)MIN/K.X_{ab} + MIN).n$$

where $X'_{ab}$ represents the correction factor for a given matrix location a, b, K represents the weighting factor, MIN represents the average minimum count value, and $X_{ab}$ represents the count value of matrix location a,b.

6. The radiation sensing device of claim 4, wherein said controller means also includes means for replacing the count value in said matrix location with the corresponding derived correction factors.

7. The radiation sensing device of claim 6, wherein said controller means also includes means for determining the average minimum correction value of a plurality of neighboring matrix locations and for providing an output signal if the minimum correction factor is below a predetermined limit.

8. The radiation sensing device of claim 4, wherein the minimum count value among neighboring matrix locations is determined within a predetermined submatrix area of said memory matrix location.

9. A radiation sensing device comprising:
   a radiation camera including scintillator means for converting radiation to light flashes and a plurality of photosensitive means viewing said scintillator means for converting said light flashes to a plurality of electrical signals;
   detection circuit means for converting said plurality of electrical signals to pairs of analog x,y coordinate values indicative of the locations of valid radiation events;
   display means responsive to each said analog x,y coordinate value for displaying the location of said event; and
   correction means operatively connected to said display means for randomly rejecting a predetermined percentage of the events occurring at a particular location.

10. The radiation sensing device of claim 9, wherein said means for randomly rejecting includes means for randomly rejecting different percentages of events at each location.

11. A radiation sensing device comprising:
    a radiation camera including scintillator means for converting radiation to light flashes and a plurality of photosensitive means viewing said scintillator means for converting said light flashes to a plurality of electrical signals;
    detection circuit means for converting said plurality of electrical signals to analog, x,y coordinate values indicative of the location of a given light flash; and
    means for correcting inherent field nonuniformity by altering the quantity of detected radiation events recorded for a given location.

12. The radiation sensing device of claim 11, wherein the means for altering radiation events is done on a random basis in real time.

13. A process for affecting intrinsic nonuniformity of a radiation camera of the type including scintillator means for converting radiation to light flashes and an array of photosensitive means viewing the scintillator means for converting the light flashes to a plurality of electrical signals indicative of the energy and coordinates of the location of the radiation, comprising the steps of:
    irradiating the scintillator means with a uniform flood source of radiation;
    for each corresponding pair of coordinates, accumulating the number of valid radiation events due to the uniform flood source;

creasing the accumulation of the number of radiation events at all locations and determining the minimum count;
determining a correction factor for each x,y coordinate location according to the relation of the minimum count to the count stored in each x,y coordinate location;
storing the corresponding factor for each x,y coordinate location;
accessing the corresponding correction factor by means of the x,y coordinate values produced with a valid detected radiation event produced by a radiation subject;
comparing the correction factor with a random number from 0 up to the highest correction factor; and then
controlling the recordation of the x,y coordinates of a valid radiation event in accordance with the relationship between the random number and the corresponding correction factor.

14. The process of claim 13, further comprising the step of temporarily storing the x,y coordinate values of a valid radiation event as they are produced and then producing corresponding x,y coordinate values of valid radiation events at a uniform rate.

15. The process of claim 13, further comprising the step of:
temporarily storing x,y coordinate values of a valid radiation event while the corresponding correction factor is being accessed from storage and compared with the random number; and then
producing the x,y coordinate values of the valid radiation event substantially synchronously with the outcome of the comparison of the corresponding correction factor and the random number.

16. The process of claim 13, further comprising the step of:
determining neighboring x,y coordinate locations surrounding the location of the minimum count; and then
determining the counts in each of the neighboring locations and determining the average of the counts to establish the minimum count to be used as a basis for determining the correction factors.

17. A radiation sensing device comprising:
a radiation camera including scintillator means for converting radiation to light flashes and an array of photosensitive means viewing said scintillator means for converting said light flashes to a plurality of electrical signals indicative of the energy and location of the radiation;
detection circuit means responsive to said plurality of electrical signals from said camera for producing coordinate values indicative of the location of a valid radiation event;
memory means for storing a plurality of correction factors within a predetermined range of numbers, said correction factors being associated with respective locations of valid radiation events;
means for retrieving a corresponding correction factor from said memory means by using the coordinate values from said detection circuit means;
means for generating numbers selected at random from said predetermined range of numbers;
means for comparing a correction factor retrieved from said memory means with the number generated by said random number generating means to produce an output indicative of the size relationship between said correction factor and said random number;
display means responsive to said detection circuit means for displaying a valid event at a location corresponding to said coordinate values; and
means for controlling the displaying of said valid event by said display means in accordance with the output of said comparing means.

18. A process for affecting intrinsic nonuniformity of a radiation camera of the type including scintillator means for converting radiation to light flashes and an array of photosensitive means viewing the scintillator means for converting the light flashes to a plurality of electrical signals indicative of the energy and coordinates of the location of the radiation, comprising the steps of:
irradiating the scintillator means with a uniform flood source of radiation;
for each corresponding pair of coordinates, accumulating the number of valid radiation events due to the uniform flood source;
ceasing the accumulation of the number of radiation events at all locations and determining the minimum count;
determining a correction factor within a predetermined range of numbers for each location according to the relation of the minimum count to the counts stored in each location;
storing the corresponding correction factor for each location;
accessing the corresponding correction factor by means of the coordinates produced with a valid detected radiation event produced by a radiation subject;
comparing the correction factor with a number randomly selected from said predetermined range of numbers; and then
controlling the recordation of a valid radiation event at a given location in accordance with the size relationship between the random number and the corresponding correction factor.

* * * * *